H. KEAN & J. G. ALEXANDER.
Hanging Circular-Saws.

No. 207,810.

Patented Sept. 10, 1878.

Attest:
L. K. Munn
F. K. Rogers.

Inventors:
Henry Kean.
James G. Alexander
per Edw. Dummer, Atty.

UNITED STATES PATENT OFFICE.

HENRY KEAN, OF KINNICKINNIC, WISCONSIN, AND JAMES G. ALEXANDER, OF BOSTON, MASSACHUSETTS.

IMPROVEMENT IN HANGING CIRCULAR SAWS.

Specification forming part of Letters Patent No. 207,810, dated September 10, 1878; application filed March 2, 1878.

*To all whom it may concern:*

Be it known that we, HENRY KEAN, of Kinnickinnic, in the county of St. Croix and State of Wisconsin, and JAMES G. ALEXANDER, of Boston, in the county of Suffolk and State of Massachusetts, have invented a new and useful Improvement in a Grooving Attachment for Saw-Arbors, which improvement is fully set forth in the following specification, reference being had to the accompanying drawings.

The object of our invention is to so construct, pivot, and secure two plates or disks to clamp a circular saw in position at an angle to the saw-arbor as to cut a groove of any desirable width—that is, within suitable limits.

Figure 1:
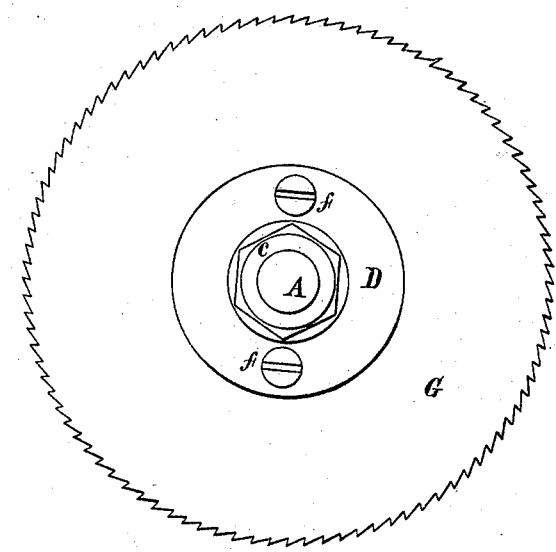
Figure 2:
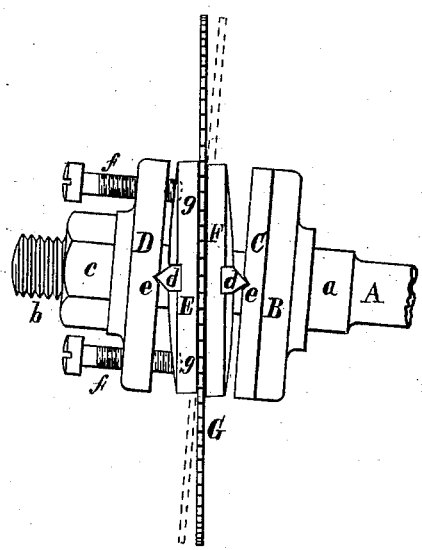
Figure 3:
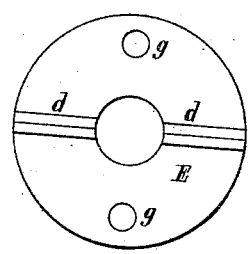
Figure 4:
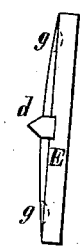

In the drawings, Figure 1 is a side, and Fig. 2 a front, view of a saw and arbor having our attachment. Figs. 3 and 4 are side and front views of one of the disks to clamp the saw.

In Fig. 2 the saw is shown by the full lines in an inclined position, while the dotted lines show it at right angles to the arbor.

The arbor A is of the usual form, having the shoulder $a$, the thread $b$, and nut $c$. On the arbor, against the shoulder $a$, is the flange B. Inside of the flange B is the disk C, which may be formed with, as a part of, the flange B. Inside of the nut $c$ is the flange D. The flanges B and D and the disk C are fitted to and made to slide on the arbor. Between the flange D and disk C are the two disks E and F, and between these two disks is the saw-plate G, to be clamped firmly thereby. The disks E and F have the center holes through which the arbor passes somewhat larger than the arbor, so that they may be inclined thereto, and each of them has two radial strips, $d$, joined thereon upon direct opposite sides of the arbor. These strips may be either separate pieces fastened firmly to the disks or formed or cast as one piece therewith. Each of the strips $d$ has a V edge, as shown, which is to set into one of the corresponding grooves $e$ in its opposite flange D or disk C. Through the flange D are screwed two set-screws, $f$, which bear endwise against the disk E, recesses or indentations $g$ being formed therein to receive them.

Now, it will be readily seen that by setting the disks E and F so that the V edges of the strips $d$ are all in the same plane, by means of the screws $f$, the disks E and F, and hence the saw, may be set at any desired angle of inclination, or at right angles to the arbor, and that the saw may then be firmly clamped in that position by means of the nut $c$. When so set and secured the saw will cut a groove of the width desired.

When the saw is to be run at right angles to the arbor that position may be insured by turning one of the disks E and F so that one set of the strips $d$ is swung out of the plane of the other, at right angles thereto, if desired, and then loosening the screws $f$ and tightening up by means of the nut $c$.

Of course, changing the strips $d$ from the disks E and F to the opposite flanges and making corresponding changes of the grooves $e$, or changing the screws $f$ from the flange D to disk and flange C and B, will not alter the nature of our invention.

We claim as our invention—

1. The combination of the disks E and F, flange, D, disk C, strips $d$, saw G, and arbor A, substantially as and for the purpose hereinbefore set forth.

2. The combination of the disks E and F, flange D, disk C, strips $d$, screws $f$, saw G, and arbor A, substantially as hereinbefore described.

HENRY KEAN.
JAMES G. ALEXANDER.

Witnesses:
 EDW. DUMMER,
 HENRY W. BRICHER.